(No Model.) 2 Sheets—Sheet 1.
W. C. WILLIAMSON.
STEAM STEERING ENGINE.
No. 371,016. Patented Oct. 4, 1887.
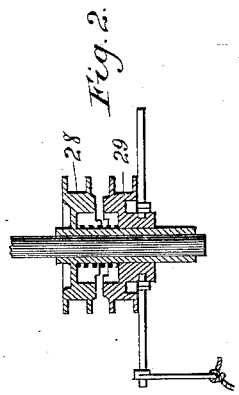
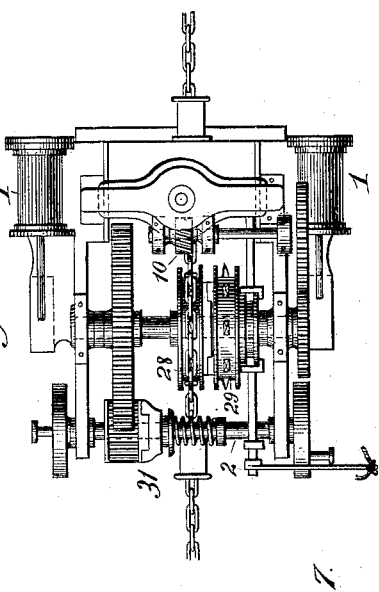
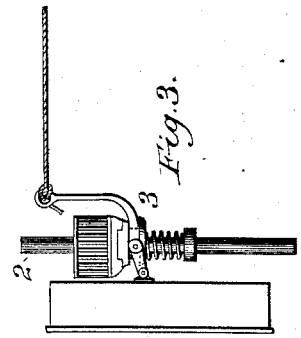
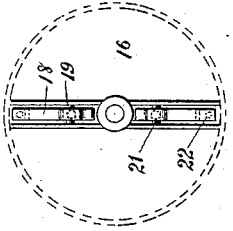
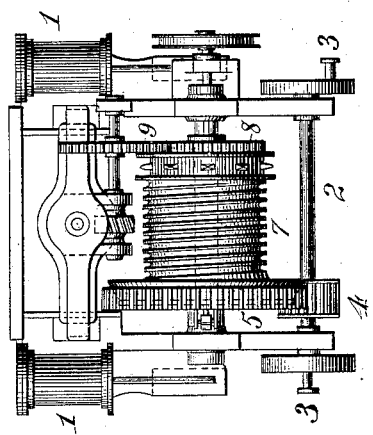
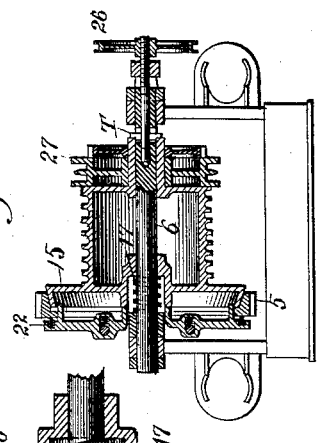
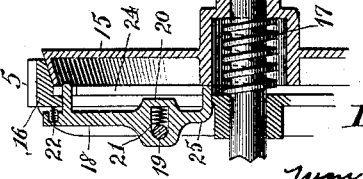
Witnesses:
Francis P. Reilly
Charles E. Dressler
Inventor.
Wm. C. Williamson
by P. H. Dodge
Atty (No Model.) 2 Sheets—Sheet 2.
W. C. WILLIAMSON.
STEAM STEERING ENGINE.
No. 371,016. Patented Oct. 4, 1887.
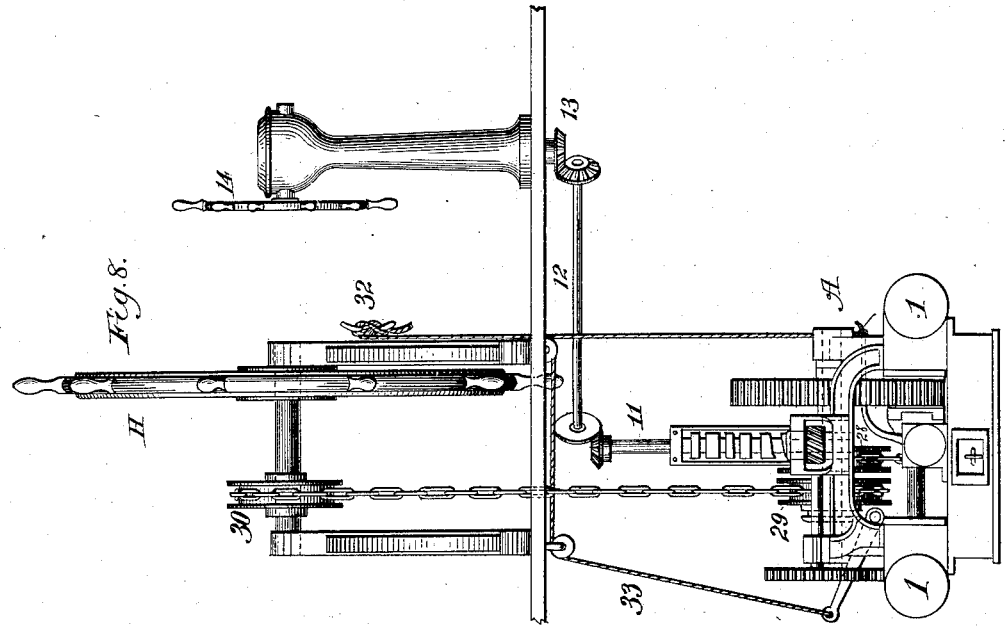
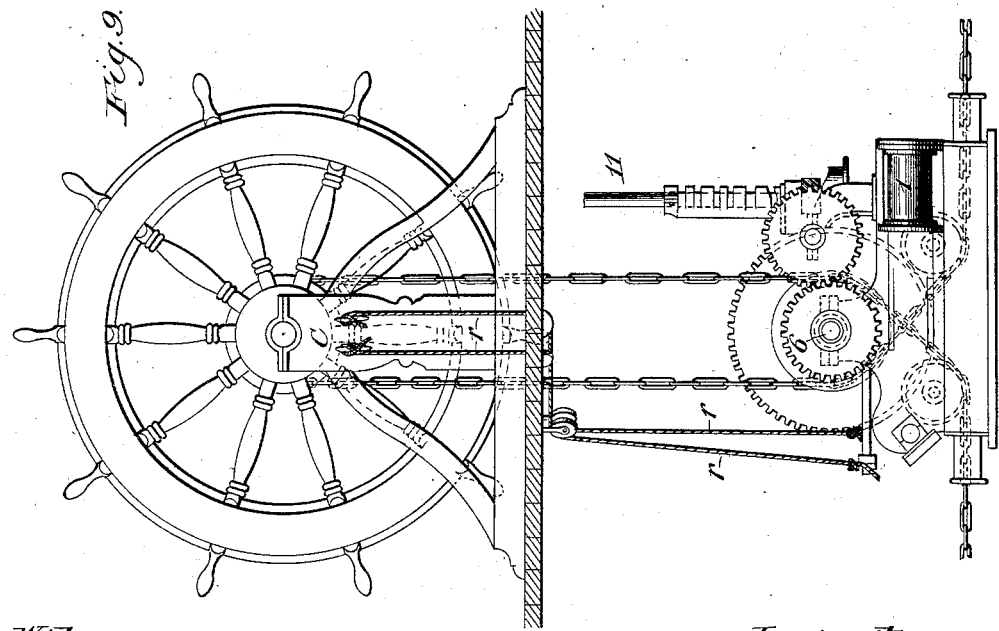
Witnesses:
Francis P. Reilly
Charles E. Dresser
Inventor.
Wm C. Williamson
by R. R. Voorhees
Atty.

UNITED STATES PATENT OFFICE.

WILLIAM C. WILLIAMSON, OF PHILADELPHIA, PENNSYLVANIA, ASSIGNOR TO GEORGE W. WILLIAMSON, JOHN D. WILLIAMSON, AND WILLIAM C. WILLIAMSON, ALL OF SAME PLACE.

STEAM STEERING-ENGINE.

SPECIFICATION forming part of Letters Patent No. 371,016, dated October 4, 1887.

Application filed March 30, 1887. Serial No. 233,031. (No model.)

*To all whom it may concern:*

Be it known that I, WILLIAM C. WILLIAMSON, of the city and county of Philadelphia, in the State of Pennsylvania, have invented certain new and useful Improvements in Steam Steering-Engines, which invention is fully set forth and illustrated in the following specification and accompanying drawings.

The objects of this invention are, first, to provide a pinion-shaft and winding-shaft of the machine each with a clutch-coupling; second, to provide a positive clutch-coupling auxiliary to a friction-clutch for the winding-shaft of the machine; third, to connect the hand-power shaft and the rudder detachably to the steam-power shaft by a single sprocket-chain. The means for accomplishing these objects will be hereinafter particularly described, and set forth in the claims.

In the accompanying drawings, Figure 1 shows in plan a double-cylinder steering-engine with its pinion-shaft and winding sprocket-shaft, each provided with a clutch-coupling. Figs. 2 and 3 show enlarged views, the former in cross-section, of said clutches detached. Fig. 4 shows in plan a steering-engine with its pinion-shaft and winding-shaft, the winding-shaft provided with a sliding drum, sprocket-wheel, and friction-clutch combined with an auxiliary positive clutch for coupling said drum to the spur-wheel driven by the pinion-shaft. Fig. 5 is a sectional side elevation of Fig. 4. Fig. 6 shows on an enlarged scale, in sectional elevation, a portion of the combined friction and positive clutch shown in the two preceding figures. Fig. 7 shows an end view of the auxiliary positive clutch shown in Fig. 5. Fig. 8 illustrates in end elevation a machine like that shown in Fig. 1, connected to the hand steering-wheel shaft, shown in side elevation, by a sprocket-chain and to the steam steering-wheel by shafting and gearing, ropes being led to the wheel-housing for operating the clutches. Fig. 9 shows in side elevation the steering-engines with sprocket-shaft and hand steering-wheel (in end elevation) connected to each other and to the rudder by a sprocket-chain, ropes being led to the wheel-housing for operating the clutches.

In said figures the several parts are indicated by numbers as follows: The numbers 1 indicate the steam-cylinders; 2, the pinion-shafts provided with cranks 3 and pinions 4. Said pinions gear with spur-wheels 5 on the winding-drum shafts or sprocket-shafts 6, which are provided with a rope or chain drum, 7, for carrying the tiller ropes or chains, as shown in Figs. 4 and 5, but with sprocket-disks in the other figures, as hereinafter described. The shafts 6 are also each provided with a spur-gear, 8, which meshes into a similar gear, 9, on a short shaft provided with a worm-wheel, 10, operated by the vertical worm-shaft 11. Said shaft is operated from the deck to stop and start the steam-power by means of the bevel-gearing and shafting 12 13 and hand-wheel 14. (Shown in Fig. 8.) The shaft of the worm-wheel 10, being connected to any reversing-gear, (not shown,) completes the necessary steam actuating machinery, which part of the apparatus need not be further described here, as it forms no part of the invention herein claimed, and does not or need not differ from any well-known form of steam steering machinery.

The combined friction and positive clutch (illustrated in Figs. 4, 5, 6, and 7) is constructed and operates as follows: Forming part of the sliding drum 7 is the friction cone-disk 15, kept out of contact with the internal cone friction-disk 16 (forming the body of the spur-wheel 5) by the spring 17. The disk 16 is keyed fast to the shaft 6, as usual with such friction-clutches; but it is provided with two or more rocker-arms, 18, radially disposed and rocking on studs 19, set in the disk 16. Within the slot 20 in each of said rocker-arms is set a coiled spring, 21, which presses hard against one end of the slot and against the stud 19, passing through the slot. Near the top or outer end of each rocker-arm is secured another coiled spring, 22, compressed between said arm and the rear of the disk 16, which spring, when the friction-clutch is thrown out, forces back the top of the rocker-arm, and thereby throws its hook or lug 23 away from between the radial arms 24 on the front of the cone-disk 15. Each rocker-arm 18 is also provided with a lower hook or lug, 25, set in line with the annular hub of the cone friction-disk 15.

The wheel or pulley 26 may be connected by a rope or chain to a wheel on deck, placed conveniently to the helmsman. Said wheel 26 is keyed fast on a screw-threaded shaft working through a stationary nut, the end of said shaft as it advances forcing forward a straight pin guided in the bore of the shaft 6, so that said pin bears hard against a cross-key fitted to the end of the hub of the drum 7. By turning said wheel 26 in one direction, it is obvious that said pin and the cross-key T will force the cone-friction 15 hard into the internal cone-disk, 16. By reversing said wheel 26 the spring 17 will throw back the disk 15 and so open the friction-clutch. So far this operation of the friction-clutch is not novel; but in so operating it the positive clutch, forming part of this invention, is also operated as follows: When the cone-disk 15 is advanced to be thrown in, its hub strikes the lower hooks or lugs, 25, of the rocker-arms 18, and thereby throws forward the upper lugs 23, the arms 18 turning on their studs 19 as pivots. Said lugs 23 thus thrown forward will either pass between the radial arms 24 on the disk 15, or they may strike them if they happen to be just opposite. Should such striking occur, the impact will force the rocker-arms bodily backward by compressing the springs 21, and as the disk 15 rotates its radial arms 24 will clear the hooks 23, when the springs 21 being no longer under compression, and the hub of the drum 7 pressing hard against the lower lugs, 25, of the rocker-arms 18, their outer lugs 23 will immediately spring in between the fixed radial arms 24 of the disk 15. It is obvious that when this happens the friction-clutch can never slip farther than to take up such lost motion as may be due to the distance of any one hook or lug 23 between any two contiguous radial arms, 24. The friction-clutch is thus converted into a positive clutch, the friction preventing violent slamming or backlash due to the lost motion above mentioned. The sprocket-disk 27, keyed fast to the hub of the drum 7, is intended to connect said drum by a sprocket-chain with a hand steering-wheel on deck, so that when the drum-clutch is thrown out, as just described, the rudder will be operated by said hand-wheel, which will rotate said drum independently of the shaft 6, the drum revolving loosely on it.

In Fig. 1, instead of the drum 7 shown in Fig. 4, a sprocket-wheel, 28, keyed fast to the shaft 6, is used, which wheel is connected to the rudder by a sprocket-chain. In place of a friction-clutch a positive spring-clutch of ordinary construction is interposed between said sprocket-wheel 28 and another sprocket-wheel, 29, loosely mounted on the hub of the former. The sprocket-wheel 29 is intended to be connected to a hand-wheel shaft on deck, as shown in Fig. 8 at 30. The pinion-shaft 2, Fig. 1, is provided with an ordinary sliding clutch, 31, operated by a spring and lever. Said clutch and the clutch uniting the sprocket-wheels 28 and 29 are shown, respectively, in Figs. 2 and 3 detached and enlarged, with ropes connected to their levers for throwing one of them out of gear and letting the other fly out of gear, which ropes may be led up to the deck and secured conveniently near the helmsman, as shown at 32 33, Fig. 8.

In Fig. 9 the machine is shown with but a single sprocket-chain connecting the shaft of the hand-wheel H, the steam-power winding-shaft 6, and the rudder. This is a neat and cheap arrangement, particularly for small steering-engines. The clutches for throwing out the steam-power may be operated by the helmsman by means of the ropes $r$, led up and secured to cleats $c\ c$ on the wheel-housing.

Instead of setting the guide-sheaves for the sprocket-chain somewhat nearer under the center of the winding-shaft, as shown on the left of Fig. 9, said chain may be crossed so as to lead one part of the chain from the right of the shaft to the left-hand sheave and the other part from the left of the shaft to the right-hand sheave, the object of course being to cause said chain to more closely hug the sprocket-wheel on the winding-shaft.

Having thus fully described my said improvements, as of my invention I claim—

1. In a steam and hand power steering-machine, in combination with a hand-power shaft, an engine-shaft, and a winding-shaft geared together by toothed gearing, and each of said two latter shafts provided with a clutch-coupling, whereby said winding-shaft may be operated by hand-power to move the rudder independently of the engine-shaft, and also by steam-power independently of the hand-power shaft, substantially as and for the purposes set forth.

2. In a steam steering-machine, a winding-shaft provided with a friction-clutch, in combination with a positive clutch consisting of radial rocker-arms on one part of the clutch forced in between fixed radial arms or stops on the other part of the clutch whenever the friction-clutch is thrown in and freed clear of said fixed arms or stops whenever the friction-clutch is thrown out, substantially as and for the purposes set forth.

3. In a combined steam and hand power steering-machine, the combination of a hand-wheel shaft, a steam-power-driven shaft, a clutch-coupling for disconnecting the same from the engine, and a rudder, each shaft provided with a sprocket-wheel, and all connected by one and the same sprocket-chain, whereby the rudder is operated either by hand-power alone or by steam-power alone by one and the same chain, substantially as and for the purposes set forth.

WM. C. WILLIAMSON.

Witnesses:
FRANCIS P. REILLY,
JOHN TULLY.